United States Patent

[11] 3,553,441

[72] Inventor Mark Launder
Wabash, Ind.
[21] Appl. No. 558,922
[22] Filed June 20, 1966
[45] Patented Jan. 5, 1971
[73] Assignee Horizons Unlimited-Problems Solved By Ideas Corporation
Wabash, Ind.
a corporation of Indiana

[54] DIRECT COMPUTING STATISTICAL SYSTEM
12 Claims, 3 Drawing Figs.
[52] U.S. Cl. .................................................. 235/92,
119/51, 222/23, 340/174.1
[51] Int. Cl. ..................................................... G01f 11/28
G11b 3/00
[50] Field of Search ........................................ 235/92, 20,
36, 61.117, 91/65, 29(fl), 92(36, 25, 66); 222/23;
119/51; 178/17.5; 340/147PROG, 174.1

[56] References Cited
UNITED STATES PATENTS
| | | | |
|---|---|---|---|
| 2,344,497 | 3/1944 | Cooney | 234/5.8 |
| 3,175,139 | 3/1965 | Rose | 318/102 |
| 3,272,180 | 9/1966 | Schommer | 119/52 |
| 3,282,252 | 11/1966 | Seymour | 119/51.11 |
| 2,907,004 | 9/1959 | Kun Li Chien et al. | 340/174 |
| 3,088,101 | 4/1963 | Schrimpf | 340/174.1 |
| 3,099,817 | 7/1963 | Kendall | 340/172.5 |
| 3,176,267 | 3/1965 | Bolton | 340/51 |

Primary Examiner—Maynard R. Wilbur
Assistant Examiner—Joseph M. Thesz
Attorney—Jeffers and Rickert

ABSTRACT: A statistical system is disclosed for monitoring a process such as an automated animal house wherein a tape memory having information indicative of a first variable and a rate of advancement indicative of a second variable is monitored at first and second points and the two monitored items of information are used to increment and decrement the contents of a register to yield a consumption rate of the first variable per unit of the second variable.

INVENTOR
MARK LAUNDER
BY
Hood, Gust & Irish
ATTORNEYS

INVENTOR
MARK LAUNDER
BY
Hood Gust & Irish
ATTORNEYS

DIRECT COMPUTING STATISTICAL SYSTEM

The present invention relates to a statistical system for recording, upon a memory system which is advanced at a rate proportional to delivery of information from a first source, information from a second source, and for presenting currently a reading which demonstrates the amount of information from said second source so recorded during the advancement of said memory system which has resulted from the delivery of a predetermined quantity of information from said first source.

Illustrative of such a system, but without limitative intent, means may be provided to advance at a constant velocity a tape or ribbon capable of accepting and retaining a detectable change, other means may be provided to impress such a change on the tape periodically at points on the tape dependent upon the current degree of advancement of such tape and in accordance with variations in a variable condition, and read-out means may be provided, effective, at any point in time, to read a preselected discrete portion of the tape and to affect indicator means in such a manner as to indicate the total information represented by the changes embraced in such discrete portion of the tape.

An embodiment of such a system has been applied in a plant for raising chickens and it will be described in that relation, though it will be understood that the underlying principles of the system are also applicable in myriad environments almost totally unrelated to such an application. In that connection, it may be noted that while time is one of the conditions involved in the herein-illustrated embodiments of the invention, it need not necessarily be so, and that the scope of the true invention includes systems in which any kind of information may be read in terms of any other kind of information.

It is known that a sharp reduction in feed consumption rate is a symptom of certain diseases, particularly in chickens, that a sharp reduction in the water consumption rate is a symptom of other diseases and that a sharp increase in consumption of either food or water also indicates an abnormal condition of the stock. If such changes can be detected promptly, epidemics which otherwise might sweep through a flock can be caught early enough to accomplish important savings. Although it has long been conventional to supply feed and/or water to suitable receptacles in poultry houses automatically in response to demand resulting from consumption rate, and although counting registers have sometimes been associated with the individual delivering means in such systems, a determination of daily consumption rates has required the maintenance of written records and the performance of arithmetical calculations based upon those records.

A primary object of the illustrated embodiments of the present invention is to provide mechanism of such character as automatically to produce a legible record which will show at a glance the total consumption of food and/or water over the immediately preceding predetermined interval of time. A further object thereof is to provide, in such a system, a register or indicator which will currently shown the amount of feed and/or water which has been supplied, by such demand-responsive delivery means, over such immediately preceding time interval.

Still another object of the invention is to provide mechanism through which, by suitable manipulation and without performing any calculations of any kind, the operator of such a system may read and compare delivery quantities which have occurred over a plurality of individual, successive, equal time intervals. By means of such comparisons, the operator can, of course, promptly detect any significant changes in the rate of consumption of feed or water and take appropriate corrective steps.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Figure 1:
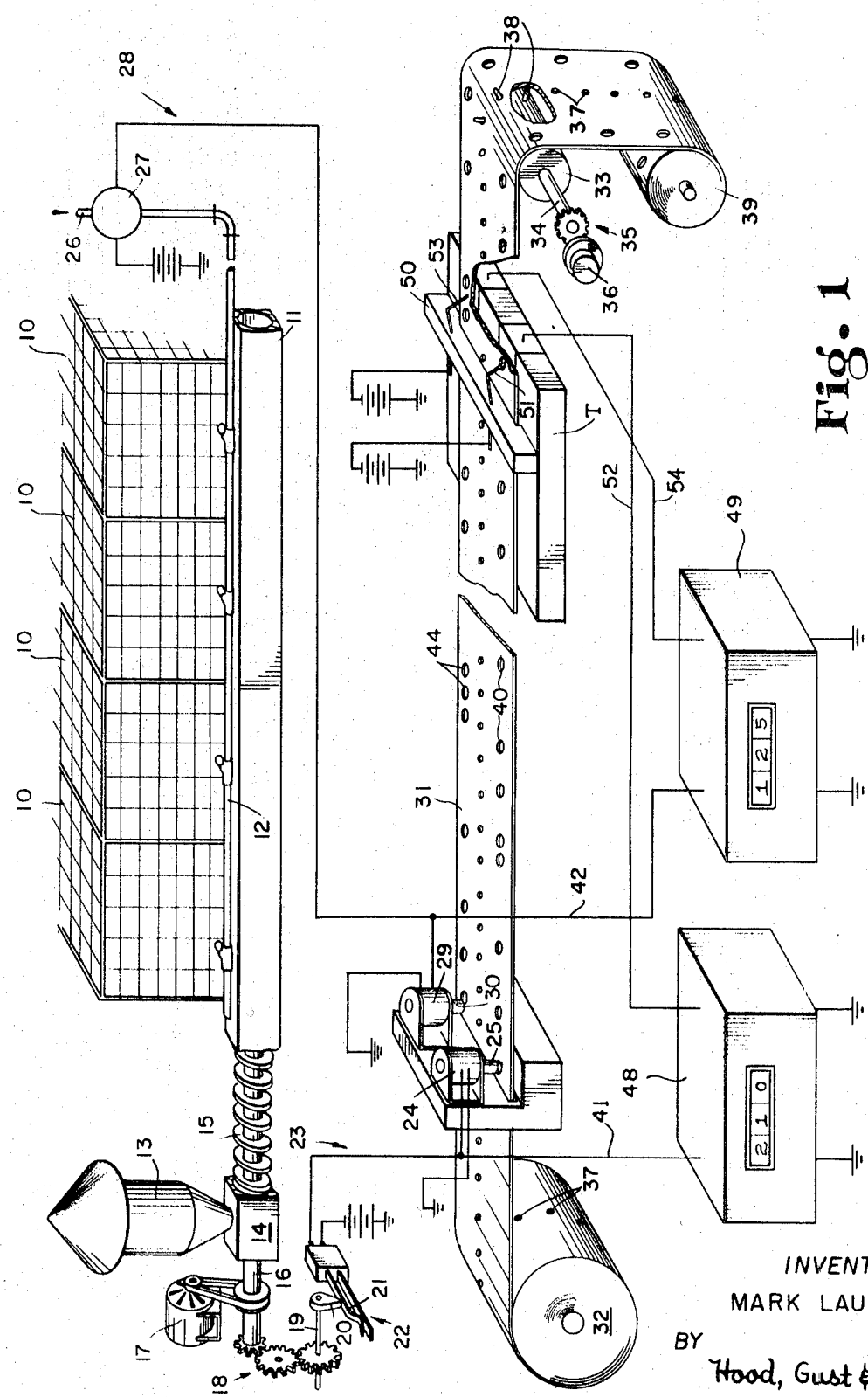
FIG. 1 is a somewhat diagrammatic perspective view of one form of embodiment of the present invention.

Referring more particularly to FIG. 1, it will be seen that I have illustrated a plurality of cages 10 which may form a part of one rank of cages in a poultry house. Each such cage will contain a plurality, for instance seven, of chickens, and there is installed in each cage a receptacle for feed and a separate receptacle for water. A conveyor or manifold 11 parallels the bank of cages with a delivery connection to each cage, each such connection including demand-responsive means whereby feed will be delivered from the manifold to the cage receptacle in accordance with the consumption rate of the occupants of the cage. A water manifold 12 similarly parallels the bank of cages, with a demand-responsive connection to the water receptacle in each cage. Since such demand-responsive connections for both feed and water are well known and form no part of the present invention, they are neither illustrated nor described in detail herein.

I have indicated a feed bin or hopper 13 operatively connected to an intake box 14 associated with the manifold 11, and a screw or other conveyor means 15 effective, upon rotation, to move feed from the box 14 through the manifold 11 in a well-known manner. The screw 15 is driven by a shaft 16 which, in turn, is suitably driven by a motor 17 whose operation is demand-responsive in accordance with well-known practice.

Through gearing 18, the shaft 16 drives a cam shaft 19 carrying a cam 20 which is cooperative with one blade 21 of a switch 22 momentarily to close the energizing circuit 23 of a solenoid 24 once upon each revolution of the cam shaft 19. Upon each energization, the solenoid 24 advances a normally-retracted punch 25 for a purpose which will appear.

It will be perceived that, through the operation of the mechanism thus far described, the punch 25 will be actuated in timed relation to the conveyor 15 and after each delivery of a measured increment of feed to the cages 10.

Water is delivered to the manifold 12 from a water supply line 26 through a measuring delivery device 27 which is of such character as momentarily to close a circuit 28 upon each passage therethrough of a measured increment of water. The circuit 28 dominates a solenoid 29 similar to the solenoid 24 and similarly controlling a punch 30.

In the embodiment of the invention illustrated in FIG. 1, an elongated sheet 31 of flexible, dielectric material such as paper constitutes a record-receiving element or movable memory system capable of receiving and retaining detectable indicia or indications. As shown, the sheet or strip 31 is led from the supply roll 32 over a driving roll 33 mounted on a shaft 34 which is driven, through suitable gearing 35, by a clock-type motor 36. Suitable means is provided to ensure that the strip will be driven unidirectionally at constant velocity; and, as shown, said strip is preformed with a series of indexing perforations 37 with which engage properly located spikes 38 on the roll 33. Alternatively, an additional, time-controlled punch (not shown) may be provided to form the perforations 37 at predetermined time intervals. From said roll 33, the strip is preferably led to a windup roll 39 which is suitably driven preferably through a slip clutch (not shown).

In the indicated embodiment of the invention, an electrically-conductive table T is disposed between the rolls 32 and 33 and the sheet 31 passes over said table, preferably in contact with its upper surface, as it moves between the rolls 32 and 33.

The punches 25 and 30 are disposed between the roll 32 and the table T so that, as the sheet progresses toward the table T, each energization of the solenoid 24 will impress an index or indication upon said sheet and each energization of the solenoid 29 will impress a distinguishable index upon said sheet. In the illustrated embodiment of the invention, of course, and since the solenoids 24 and 29 dominate punches, such indicia or indications will be perforations or openings through the sheet or tape 31. The indicia produced by operation of the punch 25 are indicated by the reference numeral 40 and, as shown, may be arranged near one lateral edge of the sheet 31 while the indicia produced by actuation of the punch 30 are indicated by the reference numeral 44 and may be arranged adjacent the opposite lateral edge of said sheet.

A register assembly comprises an add-subtract register 48 for feed and an add-subtract register 49 for water. A circuit 41 connected in parallel with the solenoid 24 energizes the add coil (not shown) of the feed register 48 to advance that register one step whenever the punch 25 is actuated; and a similar circuit 42 in parallel with the solenoid 29 similarly energizes the add coil (not shown) of the water register 49 whenever the punch 30 is actuated. Thus, each time a unit of feed or water is delivered to the manifolds 11 or 12, that fact is registered.

At a point beyond the punches 25 and 30, a read head 50 spans and overlies the sheet 31. The read head 50 is spaced from the punches by a distance equal to that through which a point on the sheet 31 will move in a predetermined time interval such as, for instance, 24 hours. A contact finger 51 is carried by the read head in alignment with the indicia 40 and is connected in an energizing circuit 52 for the subtract coil (not shown) of the register 48, while a similar contact finger 53 is carried thereby in alignment with the indicia 44 and is connected in an energizing circuit 54 for the subtract coil (not shown) of the register 49. Thus, each time the finger 51 encounters a perforation 40 it will act to move the register 48 reversely by one integer; and each time the finger 53 encounters a perforation 44 it will similarly act to reverse the register 49.

Thus, it will be seen that, at any instant, the register 48 will directly read the amount of feed supplied by the conveyor 15 over the immediately preceding 24 hours, while the register 49 will directly read the amount of water supplied by the delivery device 27 over the same period.

Figure 2:
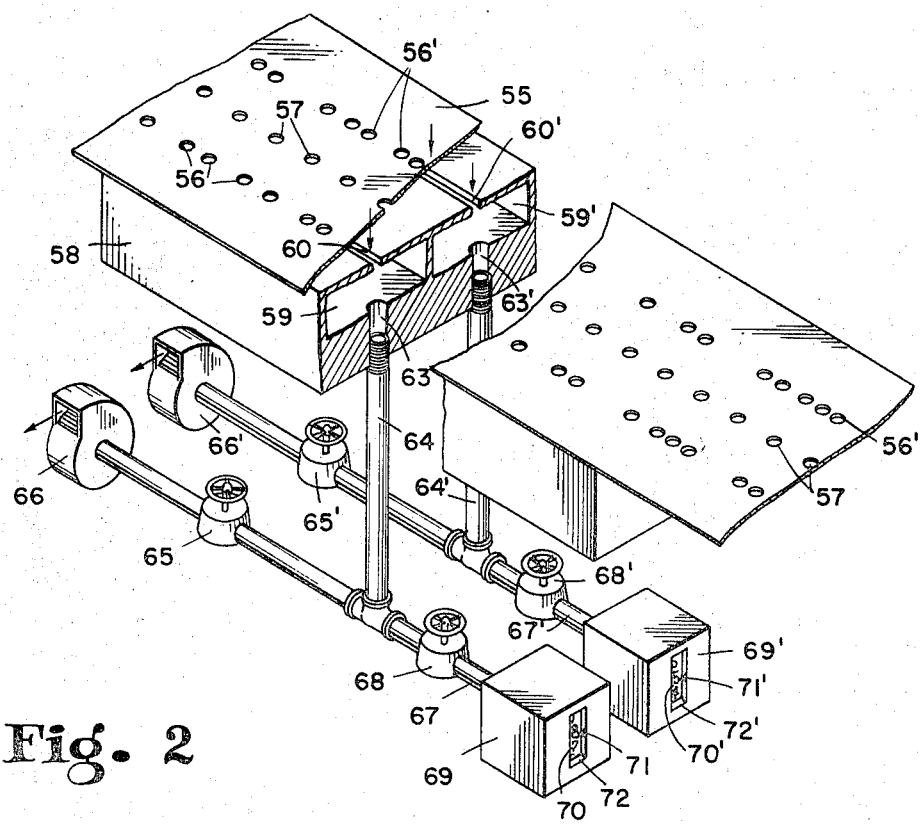
FIG. 2 is a similar view of a modified form of scanning or read-out mechanism for use in a system of the general character of that illustrated in FIG. 1.

Referring, now, to FIG. 2, a different form of read-out device, which may be used to scan tape which has been code marked by mechanism such as that illustrated in FIG. 1, is shown.

The illustrated section of tape 55 has been formed with a series of perforations 56 corresponding to the perforations 40 of FIG. 1 and with a series of perforations 56' corresponding to the perforations 44, and is provided with indexing perforations 57. The body of the tape between the perforations is substantially air impervious and may be made, for instance, of paper.

A read box 58 is formed to provide a chamber 59 whose top wall is formed with a longitudinal slot 60 whose length may preferably correspond to the distance through which a point on the tape 55 will move in 24 hours. The box 58 is disposed between the rolls 32 and 33, and the sheet 55 moves in contact with the upper surface of the box as it travels between said rolls with the perforations 56 in lineal registry with the slot 60. A further port 63 communicates with the chamber 59 and receives one end of a conduit 64 which leads, through a calibrated flow-control valve 65, to the intake of a vacuum blower or pump 66. A branch pipe 67, controlled by a calibrated flow-control valve 68, leads to a manometer 69 provided with a dial 70 and a pointer 71, visible through a window 72, either the dial or the pointer being movable relative to the other in response to variations in the pressure condition within the branch pipe 67.

It will be apparent that, with any selected setting of the valves 65 and 68, and during operation of the blower 66, the dial 70 and pointer 71 will occupy a given relative position when the slot 60 is wholly closed, and that that relative position will vary in accordance with the number of perforations 56 currently in registry with the slot. Thus, at any instant, the manometer or register 69 will currently provide a direct reading of the amount of feed supplied during the immediately preceding 24 hour period.

A corresponding system for reading the perforations 56' consists of elements identified by primed reference numerals.

Figure 3:
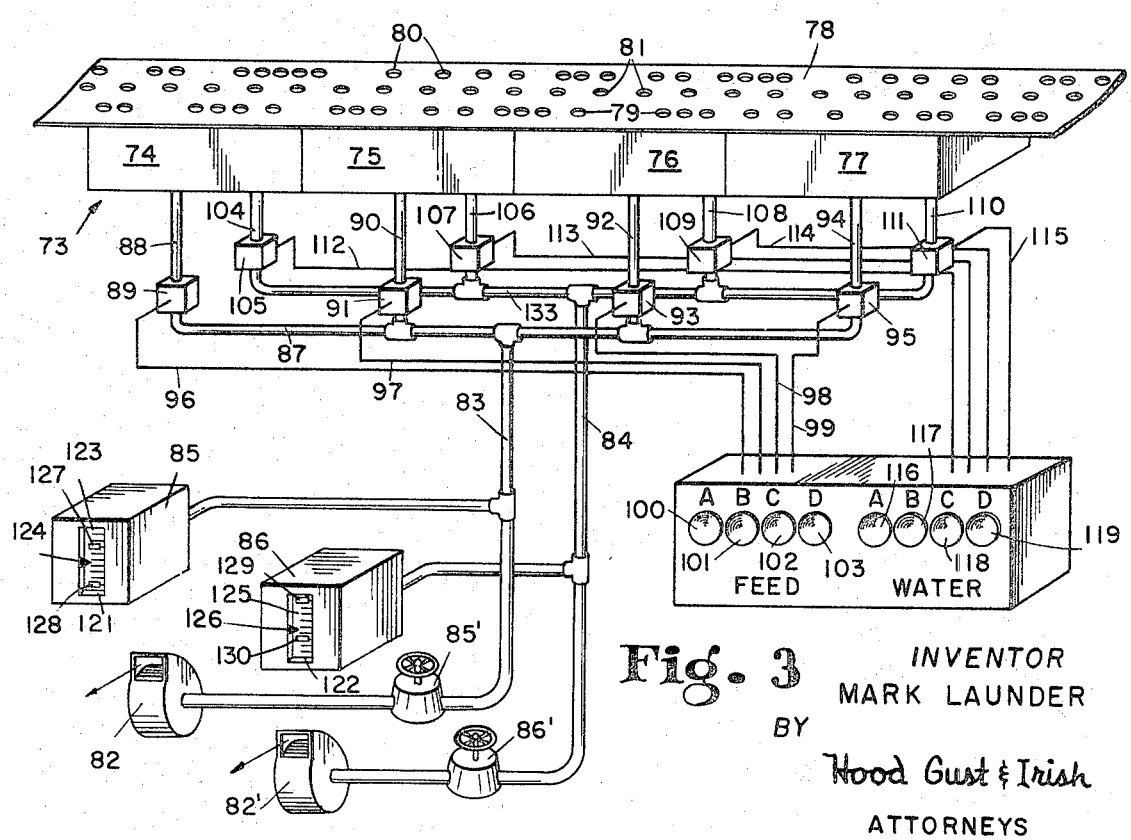
FIG. 3 is a similar fragmentary illustration of a more sophisticated read-out arrangement for such a system.

In FIG. 3, I have illustrated a more sophisticated system capable of providing, through suitable manipulation, direct readings showing the amounts of feed and water supplied during an immediately preceding time interval and, for comparison, the amounts supplied during any one or more of a plurality of successively preceding equal time intervals.

In this form of the invention, a read box indicated generally by the reference numeral 73 is divided into a plurality of separate sections 74, 75, 76 and 77 arranged in series. Each such read box section is similar to the read box 58 of FIG. 2, being provided, for cooperation with each series of indicia or perforations on the tape, with a manifold chamber like the chamber 59 formed with a slot like the slot 60 for registry with the appropriate series of perforations 79 or 80 in a tape 78 and with conduit means leading to a vacuum source, the respective chambers of the individual sections being wholly separated from each other. The punched sheet or tape 78 formed with feed supply indicia 79 and water supply indicia 80 by, for instance, punching mechanism of the character illustrated in FIG. 1, passes over the upper surfaces of the successive read box sections in such a manner that the imperforate portions of the sheet close portions of the slots of the several sections but permit air flow through such portions of the slots as are currently in registry with the indicia 79 or 80. The drive perforations 81, of course, are wholly out of registry with any slot. Thus, the degree of vacuum in any one of the chambers like the chamber 59 will vary inversely with the aggregate area of the perforations 79 or 80 currently in registry with the slot of that particular chamber.

The intake port of a vacuum blower or pump 82 is connected by a pipe 83 with a header 87. A conduit 88 leads from the feed scanning chamber of section 74 through a solenoid valve 89 to the header 87. The corresponding chambers of sections 75, 76 and 77 are similarly connected to the header 87 by conduit 90 and valve 91, conduit 92 and valve 93 and conduit 94 and valve 95, respectively. Valves 89, 91, 93 and 95 are dominated respectively by circuits 96, 97, 98 and 99 which are respectively controlled by push buttons 100, 101, 102 and 103.

In a similar fashion, a pipe 84 connects the intake port of a second vacuum pump 82' with a header 133. The water supply scanning chamber of section 74 is connected to header 133 by conduit 104 dominated by solenoid valve 105 and the corresponding chambers of sections 75, 76 and 77 are similarly connected to said header 133 by conduits 106 and valve 107, conduit 108 and valve 109 and conduit 110 and valve 111, respectively. The valves 105, 107, 109 and 111 are dominated by circuits 112, 113, 114 and 115, respectively, said circuits being respectively controlled by push buttons 116, 117, 118 and 119.

The indicator means in this system may constitute a manometer or draft gauge 85, generally of well-known construction, connected to the pipe 83 between the header 87 and the pump 82; and a similar manometer 86 similarly connected to the pipe 84. Preferably, a calibrating valve 85' is installed in the pipe 83 between the pump 82 and the point of connection of the manometer 85; and a similar calibrating valve 86' is similarly installed in the pipe 84. The manometers provide windows 121 and 122 through which are respectively visible portions of a dial 123 and a pointer 124 and portions of a dial 125 and a pointer 126. Either the dial or the pointer or each indicator is movable in response to pressure variations impressed upon the indicator; and in this instance, I have indicated flags 127 and 128 associated with the dial 123 and flags 129 and 130 associated with the dial 125 to indicate safe ranges of feed and water consumption rates.

It will be understood that the sheet 78 moves successively past the sections 74, 75, 76 and 77 of the read box 73. The longitudinal extent of each slot of each such section may be equivalent to the distance through which a point on the tape 78 will move in a 24 hour period (or any other selected, predetermined time interval); and the distance between adjacent ends of successive slots is negligible. Thus, on a Saturday, for instance, at 12 0'clock noon, a manometer reading taken from the section 74 would show the quantity of food and water supplied by the system between Friday noon and Saturday noon. At the same moment, a reading taken from the section 75 would show food and water consumption over the period from Thursday noon to Friday noon, a reading taken from the section 76 would show such consumption from Wednesday noon to Thursday noon and a reading taken from the section 77 would show the quantity supplied from Tuesday noon to Wednesday noon.

Preferably, the valves 89, 91, 92, 95, 105, 107, 109 and 111 are all of the normally-closed type and will be opened by energization of their respective dominating circuits. The switches respectively controlled by the buttons 100—103 and 116—119 are normally open and will be closed by depression of their respective buttons. The arrangement of the push buttons is such that when any button is depressed it will remain in switch-closing position until it is released by depression of another button of the same group; but two or more buttons of a group may be concurrently depressed and manually held in that condition.

In optimum operation of a system of the type illustrated, the buttons 100 and 116 will normally stand in switch-closing condition, so that the manometers will constantly indicate pressure conditions in the feed chamber and in the water chamber of the section 74. The proximal end of the slots of the section 74 will be immediately adjacent the punches which form the perforations 79 and 80 in response to delivery of feed and water integers, so that a perforation 79 made at 12:05 p.m. on Saturday, for instance, will move almost immediately into registry with such proximal end of the corresponding slot to affect the aggregate area of air ingress into the feed chamber of the section 74. If a perforation of the 79 series was made at exactly 12:05 p.m. on Friday that perforation will move, at the same instant, out of registry with the slot of section 74 and into registry with the slot of section 75. Therefore, at any instant, the aggregate area of perforations registering with the slot of section 74 will be the sum of the areas of all of the perforations formed in that series during the immediately preceding 24 hours (or other time interval built into the system); and the two manometers will currently indicate quantities of feed and of water delivered during that interval.

Similarly, at any instant on Saturday, depression of the buttons 101 and 117 will release buttons 100 and 116 to close valves 89 and 105 and open valves 91 and 107, whereupon the manometers will indicate the quantity of feed and of water delivered by the system during the 24 hour period ending at the same time on Friday.

If buttons 100 and 101 are concurrently depressed, the manometer 85 will show the quantity of feed delivered during the immediately preceding 48 hours; and if all four buttons 100—103 are concurrently depressed, a 4-day reading will be displayed. Thus, by judicious manipulation of the several buttons of the two groups, the poultryman may instantaneously acquire comparative information of a character which could be obtained only by written notes and arithmetical calculations in connection with the use of any previous statistical system known to me.

It will be appreciated that, in the apparatus herein illustrated, the constant-speed motor for driving the advancing roll is a "first source of information" through which the "memory system" 31, 55 or 78 is advanced; the punches 25 and 30 are "marking stations" effective to produce "detectable indicia" 40, 44, 56, 79 or 80 on the memory system in response to information delivered to the marking station from the "second information source" 22 or 27; and that the "indicator means" 48, 69, 85 or 86 will be actuated by means for reading a preselected, discrete region of the memory system to indicate the total information embraced within that discrete region. It is to be understood, however, that the invention is not limited to systems in which time is one of the types of information to be delivered and read, and that the information delivered from the "first source" for advancing the memory system may be of any character. It will be understood, as well, that the "memory system" need not be a paper tape or, indeed, any kind of tape so long as it is capable of accepting and retaining for a suitable time a detectable index, which need not be a perforation; and that, in some applications, it may be desirable to move the marking station relative to the memory system, rather than vice versa.

I claim:

1. In combination, a memory system capable of accepting and retaining detectable indicia, a marking station arranged to produce such indicia on said memory system, a first information source, means for producing relative movement between said memory system and said marking station at a rate proportional to the delivery of information to said means from said first source, a second information source, means for activating said marking station to produce such indicia on said memory system in response to information delivered to said marking station from said second source, indicator means, and means for reading the indicia on a preselected, discrete region of said memory system, said region incompassing a plurality of indicia in the direction of relative movement, said means for reading being operatively connected to actuate said indicator means to a condition indicative of the total information represented by the indicia embraced within said discrete region.

2. In combination, a memory system capable of accepting and retaining detectable indicia, a marking station arranged to produce such indicia on said memory system, means for producing relative movement between said memory system and said marking station at a predetermined time rate, an information source, means for activating said marking station to produce such indicia on said memory system in response to information delivered to said marking station from said source, indicator means, and means removed from said marking station for reading the indicia, said marking station and said reading means operatively connected to said indicator means to actuate said indicator means to a condition indicative of the total information represented by the indicia embraced within said discrete region.

3. For use with an animal house having a receptacle for animal-ingestible material and means for delivering such material thereto in increments, a statistical system comprising: an indication-receiving element, means for driving said element unidirectionally at a predetermined velocity, recording means operatively associated with said element to record an indication on said element, means responsive to said material delivering means to actuate said recording means upon delivery of each increment of material, counting means, means responsive to said material-delivering means to increase the count in said counting means, a predetermined amount upon delivery of each increment of material, and reading means operatively associated with said element at a selectable spacing beyond said recording means to scan the recorded indications, said reading means being operatively connected to said counting means to reduce said count in said counting means by said predetermined amount in response to each of said indications read thereby, whereby said counting means indicates the quantity of material delivered to said receptacle during the preceding interval represented by said selectable spacing.

4. A statistical system for an animal house comprising, in combination with a receptacle for animal-ingestible material and means for delivering such material thereto in measured increments, a record-receiving element, means for continuously driving said element unidirectionally at constant velocity, means actuable to impress an indication on said element, means timed with said delivering means so to actuate said impressing means upon delivery of each such increment, means operatively associated with said element beyond said impressing means for scanning the indications so impressed thereon, and indicator means responsive to said impressing means and to said scanning means to indicate currently the quantity of such material delivered by said delivering means during a predetermined preceding time interval.

5. The system of claim 4 including a second receptacle, means for delivering water to said second receptacle in measured increments, second means actuable to impress a distinguishable indication on said element, means timed with said water delivery means so to actuate said second impressing means upon delivery of each such increment of water, separate means operatively associated with said element beyond said second impressing means for scanning said distinguishable indications, and second indicator means responsive to said second impressing means and to said second scanning means to indicate currently the quantity of water delivered by said water delivering means during such predetermined time interval.

6. The system of claim 4 in which said record receiving means is a substantially air-impervious sheet, said impressing means is a punch which, upon each actuation, produces an index comprising an opening of predetermined effective area through said sheet, and said scanning means is a read box provided with port means aligned with such openings as said sheet passes over said box, and means effective to establish a pressure differential between the opposite sides of said sheet, said indicator comprising a manometer connected to read current values of such differential as affected by registration of such openings with said port means.

7. The system of claim 6 in which said box is divided into a plurality of separate sections each provided with its individual chamber and its individual port means, the port means of each section communicating only with the chamber of the same section, said sections being arranged in series for successive registry of said sheet therewith.

8. The system of claim 7 including a single manometer and separate conduit means connecting said manometer in parallel with said separate chambers so chambers of the several sections, valve means in each such conduit means, and valve-operating means for selectively controlling communication between said single manometer and each of said chambers.

9. In combination, an advanceable memory system, a first information source effective to advance said memory system at a rate proportional to delivery of information from said first source, a second information source effective to produce a detectable change in said memory system at a point dependent upon the current degree of advancement of said memory system, means cooperatively associated with said memory system for detecting each such change after a predetermined advancement of said memory system following the production of that change, and register means actuated forwardly each time such a detectable change is produced and actuated reversely each time such a change is detected by said detecting means.

10. A statistical system for monitoring a process comprising:
   means for detecting the present status of the process and for producing signals indicative thereof;
   memory means adapted to receive and record said signals;
   timing means for determining the elapsed time since the recording of specified ones of said signals;
   means for reading-out of said memory, a signal of a specified age; and
   register means responsive to said detecting means and said reading means and adapted to advance in response to signals from said detecting means and to decrement in response to signals read by said reading means.

11. The system of claim 10 wherein the contents of said register means represents the difference between the total value of the parameter of the process recorded and the total value of the parameter of the process read.

12. A statistical system for monitoring a process comprising:
   means for detecting the present status of the process and for producing signals indicative of a plurality of aspects of the present status of the process;
   memory means, having a plurality of locations therein, adapted to receive signals and record corresponding indicia indicative of a first of said aspects;
   means responsive to signals indicative of a second of said aspects for advancing said memory; and
   means for totalizing the information represented by the recorded indicia indicative of said first aspect contained in a predetermined number of the most recently advanced memory locations.